March 9, 1937. E. D. LILJA 2,072,894
SYNCHRONOUS MOTOR
Original Filed Nov. 21, 1931
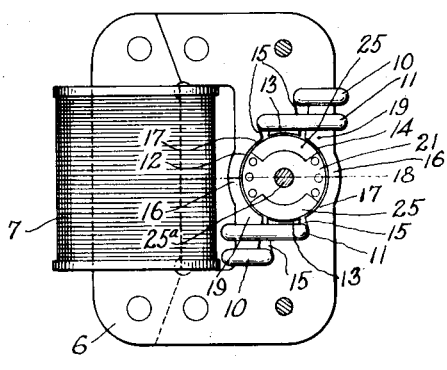
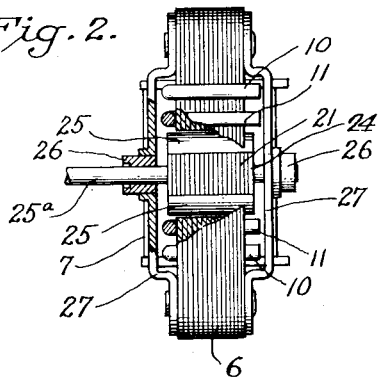
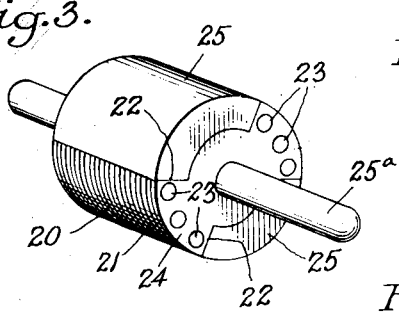
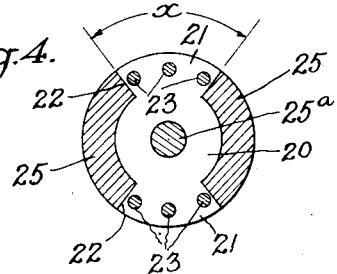
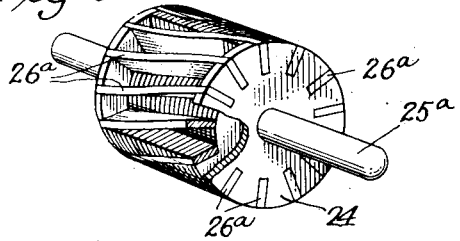
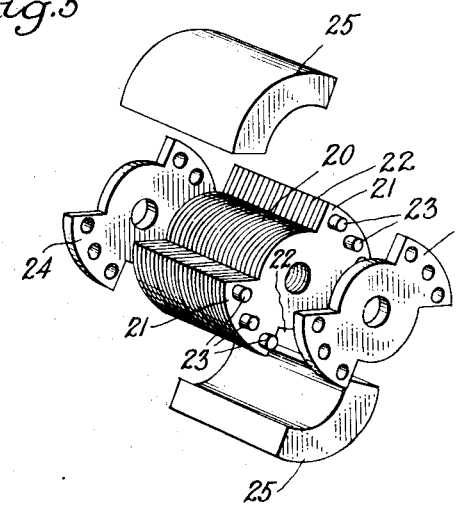
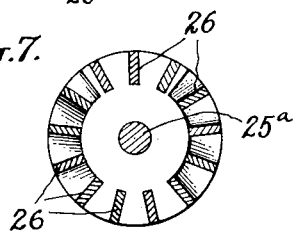
INVENTOR
Edgar D. Lilja
BY
ATTORNEYS Patented Mar. 9, 1937

2,072,894

UNITED STATES PATENT OFFICE 2,072,894

SYNCHRONOUS MOTOR

Edgar D. Lilja, Rockford, Ill., assignor to Howard D. Colman, Rockford, Ill.

Application November 21, 1931, Serial No. 576,445
Renewed May 31, 1935

8 Claims. (Cl. 172—278)

My invention relates to small synchronous motors of the shading ring type. Such motors, as heretofore constructed, develop a very low torque in starting and pulling into synchronism; consequently their use has been limited to clocks and other similar mechanism where the motor merely drives idle gearing.

One object of the present invention is to improve the efficiency of motors of the above character and the torque developed while the motor is running at synchronous speed by the provision of a novel stator construction combined with a magnetic iron rotor having salient poles.

A further object is to provide a self-starting synchronous motor of the above character having a new and improved stator construction by which the torque developed by the motor in pulling into synchronism is substantially greater than that of motors heretofore constructed.

Other objects and advantages of the invention will become apparent from the following detailed description taken in conjunction with the accompanying drawing, in which Figure 1 is a side elevational view, actual size, of a motor embodying the features of the present invention, one of the bearing plates being removed.

Fig. 2 is an elevational view looking from the right in Fig. 1 with certain of the parts broken away and shown in section in order to show the rotor in elevation.

Fig. 3 is a perspective view of the rotor in its preferred form.

Fig. 4 is an enlarged cross-sectional view of the rotor.

Fig. 5 is a perspective view showing the parts of the rotor in disassembled relation.

Fig. 6 is a perspective view of a modified form of rotor.

Fig. 7 is a sectional view of the rotor shown in Fig. 6.

In the exemplary form of the invention illustrated in the drawing, the motor stator is of the core type and comprises a rectangularly shaped laminated field member 6 approximately 2⅝ inches long, 2 inches wide and 7/16 inch thick. A main winding 7 encloses one side leg of the member 6 which leg is of substantially square cross-section. The iron of the stator is worked at high flux density, that is, near the saturation point of the iron which is attained in the present instance by employing approximately 500 ampere turns in the winding 7.

Shifting of the magnetic field around the rotor when the winding 7 is excited by alternating current is produced by the well known action of shading or short-circuited rings of which there are two in the present instance on each pole piece numbered 10 and 11. The smaller rings preferably enclose approximately one third of the pole sections on diametrically opposite sides of the rotor and for the size of motor shown in the drawing have a copper cross-section equivalent approximately to that of standard No. 8 gauge wire so that the ring has a resistance within the preferred range of from 1 to 2 x $10^{-4}$ ohms. Herein the larger rings enclose the same areas as are enclosed by the small rings and each encloses an additional section approximately equal to and preferably not greater than that enclosed by the adjacent small ring. It is preferred to employ the same size of wire for both rings although the sectional area of the larger ring may be varied considerably without materially reducing the motor output.

With the shading ring arrangement above described, it will be apparent that each pole piece is divided into unshaded, single shaded, and double shaded areas 12, 13, and 14, which are separated by slots 15 and in which the magnetic flux reaches its peak value successively, producing clockwise rotation of the magnetic field as viewed in Fig. 1 and a corresponding tendency of the rotor to turn by induction motor action as is well understood in the art. The additional shading ring 11 on each pole arranged as above described contributes materially to the high induction motor action obtained which, as will appear later, is required in order to bring the motor load near enough to synchronous speed so that the rotor will pull into synchronism.

The comparatively powerful induction motor action and the desirable synchronous characteristics of the present motor are also attributable in a large measure to the provision of magnetic extensions 16 of the unshaded pole tips 17 following around the rotor surface closely adjacent thereto at least to a point closely adjacent and preferably beyond the midline 18 between the poles. In the present embodiment, each extension is made integral with the shaded tip 19 of the opposite pole, the poles being thereby rigidly joined by a closed magnetic connection. The continuous inner surface of this connection constitutes an enlargement of the unshaded pole area 12 and encloses a larger proportion of the rotor iron than the face of the unshaded tip 17 proper thereby rendering such additional iron available for entry of the unshaded flux component which is the predominating one in the magnetic field produced in the present instance.

With the foregoing construction, those portions of rotor iron not required for efficient utilization of the inherently weaker shaded component of the magnetic field threading the areas 13 and 14, may be utilized by additional unshaded flux and the magnetic field accordingly improved. This is desirable not only from the standpoint of improving the induction motor action by which the rotor is started and brought to a speed approaching synchronism, but also in improving the synchronous characteristics.

The introduction of reluctance such as a radial air gap in the magnetic connections between the poles tends to decrease the range of distribution of the unshaded flux to the rotor iron as above described. But the proper distribution of the unshaded flux for enabling the present motor to attain synchronous speed under its own starting power, will obtain provided that the magnetic connections between the shaded and unshaded tips of opposite poles are maintained substantially closed, that is to say, no restriction is introduced in the connections 16 having an effect greater than that of a radial air gap $\frac{1}{32}$ of an inch wide located at the line 18.

The high torque developed by the present motor in pulling into synchronism with the rotating magnetic field and the comparatively greater torque developed at synchronous speed is due in part to the construction of the rotor which comprises a laminated core 20 preferably of silicon steel corresponding in length to the thickness of the stator poles. The core is of uniform cross-sectional shape throughout its length and has two salient pole projections 21 with circumferentially extending gaps 22 of non-magnetic medium between the poles. For the size of motor illustrated in the drawing, best general performance is attained when the arc $x$ (Fig. 4) included by the pole projections 21 is within a range of from 60 to 90 degrees, 75 degrees being preferred. When the motor is rendered self-starting by the use of a squirrel-cage winding, the radial depth of the gap 22 between the pole projections and therefore the height of the pole projections 21 should be from $\frac{1}{8}$ to $\frac{3}{16}$ inches.

The salient pole projections 21 are approximately equal in length to that of the rotor recess so that magnetic flux may thread the rotor pole projections from the entire area of the stator pole faces.

The squirrel-cage winding which results in the production of comparatively high induction motor action for initiating rotation of the rotor and accelerating the same to the required high speed for pulling into synchronism comprises a plurality of inductor bars 23 set near the periphery of the core and made electrically common at their opposite ends by copper disks 24. In the preferred form shown in Figs. 1 to 5, the squirrel cage is formed in part by copper plates 25 of segmental cross-sectional shape completely filling with copper the circumferential space between the poles and constituting the non-magnetic medium between the salient poles. The copper end plates may, as shown, be of the same cross-sectional shape as the iron laminations 20 and the plates 25 of a length sufficient to overlie the end plates as well as the iron. The bars 23 and plates 25 are secured to the disks 24 so that good electrical contact with the latter is maintained.

In the form of rotor shown in Figs. 1 to 5, the bars 23 are made of circular cross-section and completely embedded in the iron of the core. The rotor diameter is approximately three-quarters of an inch which is substantially the width of the poles. An extremely small air gap is maintained around the rotor by mounting the rotor shaft 25ª in bearings 26 disposed closely adjacent opposite ends of the rotor and supported by plates 27 rigidly secured to the field member 6.

With the motor constructed as above described, starting of the motor is the result of the well known induction motor action of the rotating field reacting with the currents induced in the squirrel-cage winding. The motor thus develops a comparatively high starting torque in spite of the presence of the non-magnetic gaps 22 resulting from the formation of the salient poles. While the rotor is turning at a speed below synchronous, an attractive force is exerted on each salient pole 21 each time that the peak value of the rotating field approaches or passes such pole. Due to this attraction, the rotor receives a retarding impulse as the peak value of the field approaches the rotor pole and an accelerating impulse as the field passes the pole, the latter starting when the center of the pole is passed. Although these impulses are equal in magnitude and therefore have no net accelerating effect at low speeds, near synchronism the rotor gains in speed owing to the fact that the induction motor torque is increased more as an incident to the retarding impulse than it is decreased by the accelerating impulse.

As the rotor speed increases, the induction motor action decreases but the energy imparted to the rotor during each interval that the peak value of the field is passing one of the poles, as a result of the attractive forces above described, increases owing to the smaller difference between the speeds of the magnetic field and the rotor which causes the rotor to be subjected for a longer interval to the attractive force as the rotating field passes the pole. The result is that the successive accelerating impulses momentarily cause the motor speed to rise in increasing amounts above the average speed until synchronism is attained. Thereupon the rotor locks into step with the field and the full effect of the attractive effort exerted on the poles tends to hold the rotor in step with the result that the motor will carry a substantially increased load before pulling out of synchronism. Accordingly, the pull-out torque of the present synchronous motor is materially greater than the pull-in torque or the starting torque due to the induction motor action. The efficiency of the motor at synchronous speed is accordingly high.

The powerful self-starting and synchronous characteristics of the present motor as compared to other motors of corresponding size are due in part to the strength and distribution of the rotating field resulting from the double shading ring arrangement and the provision of closed or substantially closed magnetic connections between the tips of the opposite poles. The strong synchronous characteristics are due, in further part, to the use of a rotor having well-defined salient poles of magnetic iron which make possible the utilization of the full effect of the attractive force capable of being exerted by the powerful field.

With the stator construction described, the rotating field more closely simulates that of a polyphase synchronous motor in that the field is of more constant strength and rotates with more uniform angular velocity than that of prior shaded pole synchronous motors. In prior synchronous motors wherein wide gaps have been provided between the adjacent poles, the flux through the rotor drops to a low value opposite these gaps, and the transition of the field from a shaded to the adjacent unshaded pole is so abrupt that the rotor cannot follow it and the synchronous torque is impaired. By employing pole extensions as above described, the rotor flux at the midline 18 is of relatively high value and the angular velocity of the field between the poles is more uniform because the axis of the stator field may shift with the rotor. Also there is a desirable blending of the shaded and unshaded fluxes. As a result, the rotor is locked in step with the field in all angular positions, enabling the full effect of the rotating field to be utilized more effectually and accordingly the synchronous characteristics of the motor are materially improved.

Where, as in the case of the present motor, the positions of the poles on the rotor remain fixed at all times, it will be apparent that when the rotor is at a standstill or turning at a comparatively slow speed as compared to that of the rotating field, each pole will be attracted during a compartively short angular movement of the field. For this reason, the energy capable of being imparted to the rotor during each current cycle is materially less than that which is required in order to bring the rotor to synchronous speed. The torque required for causing the rotor to attain a speed from which it will pull into synchronism is attained and the use of a rotor having salient poles is made possible in the present instance by the powerful induction motor action developed as a result of the particular stator and squirrel-cage rotor constructions above described.

If desired the rotor may be constructed as shown in Figs. 6 and 7 wherein the circumferential space between the salient poles is left open except for the inductor bars 26ª which may be made of rectangular cross-sectional shape if desired. It is preferred, however, to fill the spaces with high conducting metal as in the rotor shown in Fig. 1 owing to the increased induction motor action and improvement in starting torque which is obtained as a result of the eddy currents induced in the copper thus inserted.

With the stator constructed as above described, the motor not only develops a substantially greater torque at synchronous speed as compared to the motors heretofore constructed but also enables the induction motor action and therefore the starting torque to be increased materially without sacrifice of the synchronous characteristics.

I claim as my invention:

1. A self-starting synchronous motor comprising, in combination, a cylindrical rotor core of magnetic iron having two salient poles extending throughout its length and a squirrel-cage winding on said core, a field member having magnetic poles annularly spaced around said core, shading coils on said poles for producing shifting of the magnetic field around the recess defined by said poles, and an extension of each unshaded pole tip closely following the rotor surface and providing a substantially closed magnetic connection with the shaded side tip of the adjacent pole.

2. A self-starting synchronous motor comprising, in combination, a cylindrical rotor core of magnetic iron having two salient poles extending throughout its length and a squirrel-cage winding on said core, a field member having magnetic poles annularly spaced around said core, shading coils on said poles for producing shifting of the magnetic field around the recess defined by said poles, and an extension of each unshaded pole tip closely following the rotor surface and integrally joined to the shaded side tip of the adjacent pole.

3. A self-starting synchronous motor comprising, in combination, a cylindrical rotor core of magnetic iron having salient poles extending throughout its length and a squirrel-cage winding on said core, a field member carrying an energizing winding and having poles annularly spaced around said rotor and corresponding in number to the rotor poles, shading rings each enclosing a side portion of one pole, a larger shading ring on each pole enclosing the section of the pole enclosed by said first mentioned ring and an additional section, the other side of each pole being unshaded, magnetic extensions of the unshaded side tips of said poles, each closely following the rotor surface and forming a substantially closed magnetic connection with the shaded tip of the adjacent pole.

4. A self-starting synchronous motor comprising, in combination, a cylindrical rotor core of magnetic iron having salient poles extending throughout its length and a squirrel-cage winding on said core, a field member having magnetic poles annularly spaced around said rotor, shading coils enclosing the side portions of said poles for producing shifting of the magnetic field transversely of the poles, and magnetic connections between the unshaded and shaded tips of adjacent poles having inner surfaces closely following the rotor surface with no restriction therein greater in magnetic effect than a radial air gap $\frac{1}{32}$ of an inch wide located at the midpoint between such poles.

5. A synchronous motor comprising, in combination, a stator having two pole projections presenting a substantially continuous cylindrical iron surface defining a rotor recess, shading coils enclosing side portions of said poles for producing rotation of the magnetic field resulting from excitation of said stator by alternating current, and a rotor in said recess comprising a magnetic iron core having two salient poles each including an arc of from 60 to 90 degrees and extending throughout the length of the rotor recess.

6. A synchronous motor comprising, in combination, a field member adapted to be energized by alternating current and providing a plurality of annularly spaced pole pieces arranged in pairs, shading means on said pole pieces for producing shifting of the magnetic field around the rotor recess defined by the pole pieces, a rotor in said recess comprising a core and annularly spaced salient pole projections extending radially therefrom and arranged in pairs, said projections being composed of magnetic material and having an axial length approximately equal to the length of the recess defined by said field member, and extensions of the unshaded side tips of said pole pieces providing substantially closed magnetic connections with the shaded side tips of the adjacent pole pieces.

7. A synchronous motor comprising, in combination, a field member adapted to be energized by alternating current and providing a plurality of annularly spaced pole pieces, shading means on said pole pieces for producing shifting of the magnetic field around the rotor recess defined by the pole pieces, a rotor in said recess comprising a core and annularly spaced salient pole projections extending radially therefrom and equal in number to the number of said pole pieces, said projections being composed of magnetic material and having an axial length at least equal to eighty per cent of the length of the recess defined by said field member, and extensions of the unshaded sides of said pole pieces following around the rotor and providing substantially closed magnetic connections with the shaded sides of the adjacent pole pieces.

8. A synchronous motor comprising, in combination, a field member adapted to be energized by alternating current and providing a plurality of annularly spaced pole pieces, shading means on said pole pieces for producing shifting of the magnetic field around the rotor recess defined by the pole pieces, a rotor in said recess comprising a core and annularly spaced salient pole projections extending radially therefrom and equal in number to the number of said pole pieces, said projections being composed of magnetic material and having an axial length approximately equal to the length of the recess defined by said field member, and extensions of the unshaded sides of said pole pieces following the rotor and providing closed magnetic connections integrally joining the adjacent unshaded and shaded side tips of the adjacent pole pieces.

EDGAR D. LILJA.